United States Patent

[11] 3,607,444

[72] Inventor Eugen Szabo DeBucs
Erlangen, Germany
[21] Appl. No. 688,050
[22] Filed Dec. 5, 1967
[45] Patented Sept. 21, 1971
[73] Assignee Siemens Aktiengesellschaft
Berlin and Munich, Germany
[32] Priority Dec. 6, 1966
[33] Germany
[31] S 107279

[54] THERMOELECTRIC ASSEMBLY
8 Claims, 4 Drawing Figs.

[52] U.S. Cl. .......... 136/208, 136/211, 136/212, 136/230
[51] Int. Cl. .......... H01v 1/30
[50] Field of Search .......... 136/208–212, 204, 230

[56] References Cited
UNITED STATES PATENTS

| | | | |
|---|---|---|---|
| 2,959,925 | 11/1960 | Frantti et al. | 136/208 X |
| 3,006,979 | 10/1961 | Rich | 136/212 X |
| 3,221,508 | 12/1965 | Roes et al. | 136/212 X |
| 3,240,628 | 3/1966 | Sonntag, Jr. | 136/212 |
| 3,269,873 | 8/1966 | Dent | 136/208 |
| 3,269,874 | 8/1966 | Moeller | 136/211 |
| 3,269,875 | 8/1966 | White | 136/212 |
| 3,291,648 | 12/1966 | Sheard et al. | 136/212 |
| 3,304,206 | 2/1967 | Burdick et al. | 136/211 |

*Primary Examiner*—Carl D. Quarforth
*Assistant Examiner*—Harvey E. Behrend
*Attorneys*—Curt M. Avery, Arthur E. Wilfond, Herbert L. Lerner and Daniel J. Tick

ABSTRACT: Thermoelectric assembly includes a plurality of *p* and *n*-conductive thermocouple element legs, a plurality of contact bridges electrically interconnecting the thermocouple element legs and forming therewith a hot and cold side on opposite sides thereof, and a pair of heat exchangers located respectively on the opposite sides of the legs, at least one of the heat exchangers comprising a tube defining a flow channel for a fluid heat-exchanging medium, the tube being formed of heat-conductive material elastically deformable in a direction transversely to the axis of the tube and in the axial direction of the thermocouple element legs.

THERMOELECTRIC ASSEMBLY

My invention relates to thermoelectric assembly wherein the *p* and *n*-conductive legs of thermocouple elements are electrically interconnected by contact bridges forming therewith a hot and cold side on opposite sides of the legs, and are disposed between at least two heat exchangers, at least one of which forms a flow channel for a liquid or gaseous heat-exchanging medium.

Thermoelectric assemblies are made up of *p* and *n*-conductive thermocouple element legs formed of thermoelectrically active material which are generally electrically conductively interconnected at their hot and cold-soldered locations by contact bridges so that they are electrically connected in series and thermally connected in parallel, the cold and hot soldered locations thereof being respectively in a single plane, namely the cold and hot sides respectively of the thermoelectric device thus produced. A heat exchanger is generally placed on both the hot and the warm sides of the thermoelectric device separated by a layer of thermally conductive and electrically insulating material from the legs of the thermocouple elements.

Thermoelectric assemblies of this type should have a relatively good efficiency and should be as compact as possible for conserving space. The heat conductive contact between the legs of the thermocouple elements, on the one hand, and the heat exchangers, on the other hand, must be exceedingly good, since the efficiency of the assembly is dependent thereon to a great extent.

A temperature gradient exists between the hot and cold sides of the thermoelectric device which is very great in the axial direction of the thermocouple element legs, especially in thermal generators, and, moreover, also varies locally. Consequently, thermal expansions occur in the axial direction of the thermocouple legs, which can vary locally and can be very large. Because of these expansion forces, the local fixing or securing of the legs of the thermocouple elements between the heat exchangers must be very stable mechanically. Furthermore, care must also be taken when installing the legs of the thermocouple elements that the manufacturing tolerances in the length of the legs are not exceeded.

In order to compensate for the thermal expansion and manufacturing tolerances and to provide stable, locally fixed installation of the legs of the thermocouple elements, it has been known to exert an elastic force on the thermocouple element legs in the axial direction thereof by means of springs and possibly through a thrust member. A disadvantage of this known construction is that space is required for the springs and the thrust members, whereas, as aforementioned, it is of great importance that the thermoelectric assembly take up as little space as possible. The requirement for conserving space is particularly directed, for example, to thermoelectric converter systems that are to be installed in space vehicles such as space ships, orbiting satellites or the like, or also to thermoelectric assemblies for climatizing rooms or similar spaces i.e. to cool or heat the room or space, the thermoelectric assemblies being inserted in the walls of the room or in the walls surrounding the particular space.

It is accordingly an object of my invention to provide thermoelectric assembly which avoids the foregoing disadvantages of the heretofore known assemblies of this general type. It is more specifically an object of my invention to provide such an assembly having at least one heat exchanger constructed as a flow channel for a fluid heat exchanging medium, wherein the thermal expansions and the manufacturing tolerances in the length of the legs of the thermocouple elements are compensated without requiring any particular additional space in the thermoelectric assembly to house equipment for effecting the compensation.

With the foregoing and other objects in view, I provide in accordance with my invention, a thermoelectric assembly having a heat exchanger with a flow channel in the form of a tube of heat-conductive, elastic material, the tube being deformable transversely to the axis thereof in the direction of the axes of the legs of the thermocouple elements.

In accordance with a further aspect of my invention, the tube is formed of spring steel, pinchbeck or tombak, or spring bronze.

In accordance with another feature of the invention, a portion of the tube wall is formed with a plane surface on which the contact bridges of the thermoelectric devices are disposed.

In accordance with yet another desirable feature of the invention, the tube has a substantially rectangular cross section, of which two opposite lateral surfaces are flat and at least one of the two other opposite lateral surfaces has an arcuate portion whose apex extends in a direction substantially parallel to the axis of the tube.

In accordance with still another feature of the invention, flat plates of inelastic material of relatively good thermal conductivity, for example of copper or silver, are disposed on at least one of the planar lateral surfaces of the tube, at least one contact bridge of the thermoelectric device being located on each of the plates.

As aforementioned, in accordance with the construction of the thermoelectric assembly of the invention, thermal expansions of the legs of the thermocouple elements and manufacturing tolerances in the length of the legs are compensated by the elastic deformation of the flow channel constructed in the form of a tube. Because of the elasticity of the flow channel, no additional springs or thrust members are required and the space thereby necessary for housing them is spared. To ensure relatively good thermally conductive contact between the contact bridges of the thermoelectric devices and the flow channel, the flow channel is provided with planar surfaces on which the contact bridges are disposed. These planar surfaces are located on plates formed of inelastic material, so that the planar surfaces will not become deformed and so that no shear stresses or similar forces will be exerted on the legs of the thermocouple elements. Thereby, forces which might cause damage to the legs of the thermocouple elements are avoided.

In accordance with added features of my invention, to afford an especially space-saving and compact construction of the thermoelectric assembly, at least two layers of legs of thermocouple elements connected by contact bridges are disposed one above the other, at least one common heat exchanger being located between the contact bridges of adjacent layers. Thereby, the heat exchangers of the thermoelectric assembly are constructed of two types, on the one hand, as tubes that are elastically deformable transversely to the axis of the respective tube in the direction of the axes of the thermocouple element legs and, on the other hand, as solid blocks of relatively good heat-conductive inelastic material formed with flow channels therein, both types located respectively in alternating succession between adjacent layers of thermocouple element legs.

In accordance with other preferred features of the invention, the flow channels of all similarly constructed types of heat exchangers are respectively combined into a common circuit or loop for either a "cold" or "hot" heat exchanging medium, as the case may be. It is accordingly desirable to employ the elastically deformable tubes for the circuit of the "-cold" heat exchanging medium. Thereby, excessive heating of the elastically deformable tubes, which could cause a loss of the elasticity thereof, is avoided. A thermoelectric assembly of such construction will operate largely free of maintenance requirements.

Other features which are considered as characteristic for the invention are set forth in the appended claims.

Although the invention is illustrated and described herein as embodied in thermoelectric assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
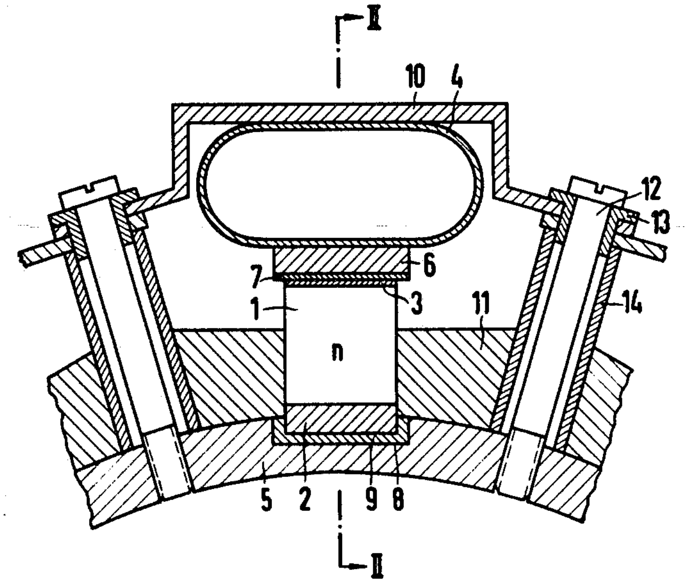
FIG. 1 is a cross-sectional sectional view of part of one embodiment of a thermoelectric generator constructed in accordance with my invention, as taken along the line I—I in FIG. 2 in the direction of the arrows.
Figure 2:
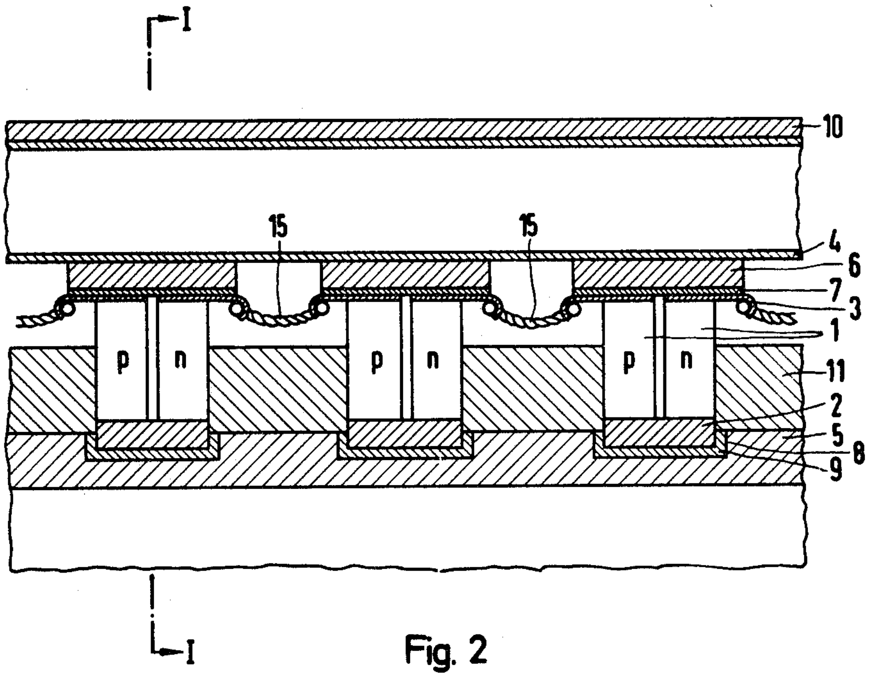
FIG. 2 is a longitudinal sectional view of FIG. 1 taken along the line II—II in the direction of the arrows.

Referring now to the drawings and first, particularly, to FIGS. 1 and 2 thereof, there are shown legs 1 of a thermocouple element alternately formed of *n* or -conductive thermoelectrically active material, such as for example a suitably doped germanium-silicon alloy. The legs 1 of each thermocouple element are electrically connected to one another by contact bridges 2 on the hot side of the legs, and the legs 1 of opposite conductivity in adjacent thermocouple elements are connected to one another by contact bridges 3 on the cold side of the legs. The thermocouple element legs 1 are located between tubular heat exchangers 4 and 5. The heat exchanger 5 on the hot side of the legs 1 is a tube or pipe of relatively very large diameter and thick wall, for example of steel. Recesses 8 are formed in the wall of the tube 5, and bushings 9 of electrically insulating and thermally conductive material are respectively located therein. The material of the bushings 9 can be a ceramic, such as aluminum oxide or beryllium oxide, for example. The contact bridges 2 of the thermocouple elements 1, 2, 3 are respectively fitted in the ceramic bushings 9. The legs 1 of the thermocouple elements are thereby maintained locally fixed with stability within the thermoelectric generator of the invention. In the thick solid wall of the heat exchanger 5, several rows of the recesses 8 are formed substantially parallel to the axis of the tube 5, so that several rows of thermocouple element legs 1 are thereby disposed on the tube 5. FIG. 1 is a view in the direction of one of such rows of legs 1.

The heat exchanger 4 on the cold side of the thermocouple elements 1, 2, 3 is separate for each row of legs 1. The heat exchanger 4 is a tube having a somewhat rectangular cross section. The tube 4 can be considered as being formed of two parallel extending, planar bands joined, as by welding, at the lateral edges thereof with bands having an outwardly curved cross section. The radius of curvature of the cross-sectional arc of the lateral bands as shown in FIG. 1 is about half of the spacing between the two parallel extending planar bands. The material of which the bands of the tube 4 are formed is spring steel, tombak or pinchbeck, or spring bronze. Because of its construction, the tube 4 is elastically deformable transversely sr perpendicularly to its own axis and in the direction of the axes of the legs 1 of the thermocouple elements. If the thermocouple element legs are of different length due to manufacturing tolerances or have expanded or become elongated due to the large temperature differences between the hot and cold side of the thermoelectric generator, the elastically deformable tube 4 becomes pressed together at the location at which it is superimposed on the particular thermocouple element legs. The counterbearing 10 in which the tube 4 is embedded produces the reactive force on the tube 4. The thermocouple element legs 1 are thereby mechanically stably anchored between the heat exchangers 4 and 5, while, however, different leg lengths or thermal expansion of the legs are compensated by the elastic tube 4. The space required by the assembly of the invention is as small as possible since separate spring elements are dispensed with.

In order to prevent the surface of the tube 4, adjacent to which the contact bridges 3 of the thermocouple element legs 1 lie, from elastically deforming and losing its planar shape, plates 6 of inelastic material, such as silver, for example, are placed against the tube 4 between it and the contact bridges 3. A thermally conductive ceramic layer 7 provides electrical insulation between the tube 4 and the contact bridges 3. Shear stresses or similar forces are prevented by the plates 6 from acting on the thermocouple element legs 1 and possibly damaging them. The counterbearing 10 is fastened with at least two screws 12 to the heat exchanger 5 located on the hot side of the thermocouple elements 1, 2, 3. The screws 12 are surrounded by thermally insulating sleeves 13 and 14 which prevent a thermal shunt between both heat exchangers 4 and 5. The heat flow along the screws 12 proper is negligible. It is advantageous, however, to provide screws formed of material which is a relatively poor heat conductor. The thermocouple element legs 1 are embedded in a layer 11 of heat-blocking material. The use of the layer 11 limits heat transfer between the hot and cold sides of the thermocouple elements 1, 2, 3 practically only to that which is conducted through the thermocouple element legs 1.

In the longitudinal sectional view of FIG. 2 through part of the thermoelectric generator there are shown three thermocouple elements, each formed of two thermocouple element legs 1 of *p* and *n*-conductive material, respectively, a contact bridge 2 electrically connecting the legs 1 on the hot side thereof, and contact bridges 3 in contact engagement with the legs 1 on the cold side thereof. The contact bridges 3 of adjacent thermocouple elements are electrically connected with silver pigtails 15. By connecting the pairs of legs of different conductivity of the adjacent thermocouple elements 1 with the flexible braided silver wires 15, compensation of a lateral or transverse thermal expansion of the leg pairs is also assured. FIG. 2 also clearly shows the arrangement of the pairs of thermocouple element legs in succeeding rows, wherein each row of legs has a common elastically deformable heat exchanger 4 on the cold side thereof.

Figure 3:
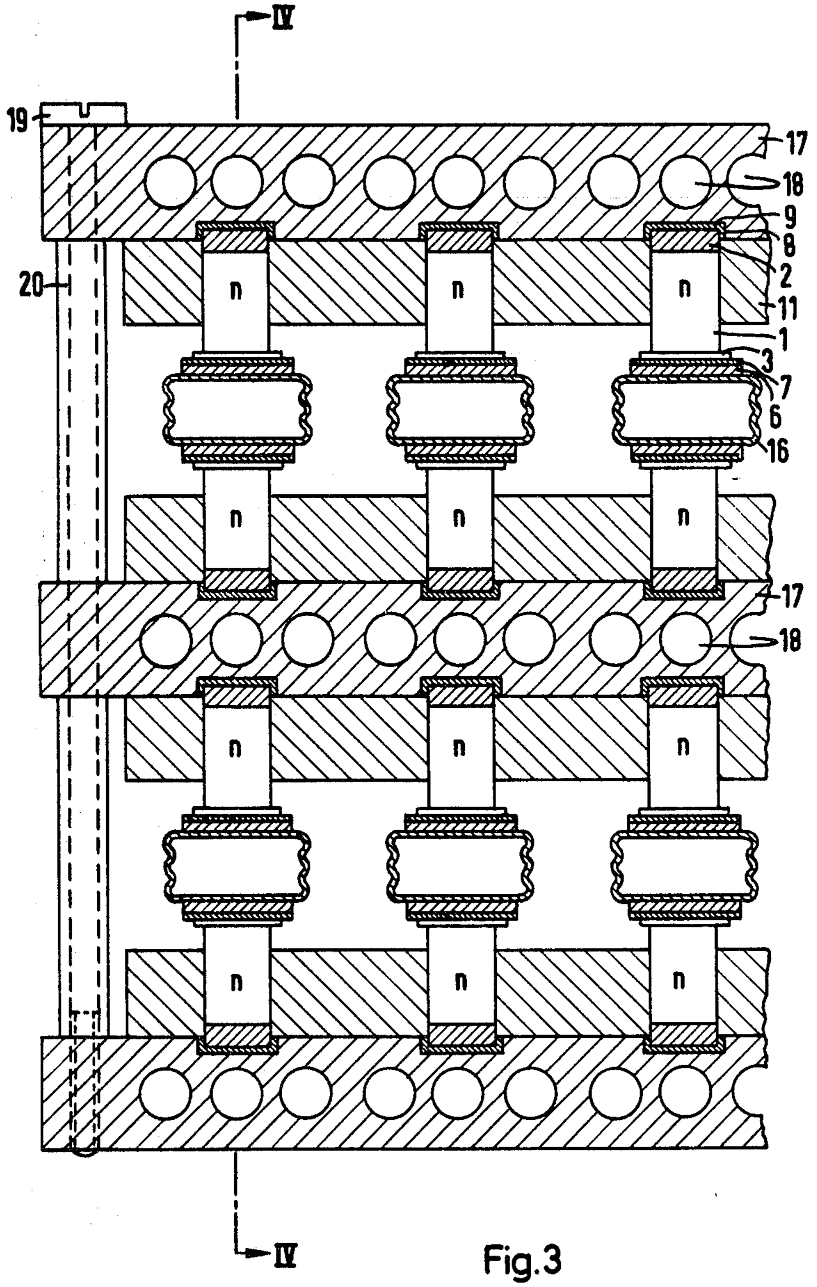
FIG. 3 is a cross-sectional view of part of another embodiment of a thermoelectric generator according to my invention, as taken along lines III—III in FIG. 4 in the direction of the arrows.

In the cross-sectional view of a second embodiment of my invention as shown in FIG. 3, four layers of thermocouple element legs 1 are located above one another, several rows of the legs being disposed adjacent one another in each layer. The thermocouple element legs 1 are again shown joined at their hot side by contact bridges 2 to form leg pairs of thermocouple elements. On the cold side of the legs 1, contact bridges 3 are contact bonded, electrically connecting a leg of one conductivity type of one thermocouple element with a leg of the other conductivity type of an adjacent thermocouple element. Those elements shown in FIG. 3 which correspond to analogous elements in FIG. 1 are identified in FIG. 3 by the same reference numerals as in FIG. 1 and are not further described herein.

Common heat exchangers 16 and 17 are located between the contact bridges 2 and 3 of adjacent layers of thermocouple element legs 1. The heat exchangers 17 on the hot side of the thermocouple elements 1, 2, 3 are made of thick plates or blocks, for example of steel, wherein several channels 18 as a flow path for the hot heat-exchanging medium are bored. In the massive heat exchangers 17, recesses 9, as aforedescribed, are formed, wherein the contact bridges 2 of the thermocouple elements 1, 2, 3 are arranged in rows one behind the other. A tube 16 is provided as heat exchanger for a cold heat exchanging medium at the cold side of each row of thermocouple elements. The tubes 16 may be considered as being formed of two parallel extending planar bands joined or welded at the lateral edges thereof with bands having a wave-shaped or corrugated cross section. The ribs of the corrugated bands or sheets extend substantially parallel to the axis of the tube 16. The material of which the tube 16 is formed is spring steel, tombak or pinchbeck, or spring bronze. Plates 6 of inelastic material, such as silver for example, are placed on the planar bands of the tubes 16 and the contact bridges 3 are superposed thereon. Since the tubes 16 are elastically deformable in the axial direction of the thermocouple element legs 1, the tolerances in the lengths of the legs and the thermal expansion thereof are compensated thereby, without having to provide separate spring elements therefor.

With the embodiment of FIG. 3 there is provided an especially compact, space-saving construction of a thermoelectric generator which is sure to operate and has a high efficiency. Separate counterbearings for the elastically deformable tubes 16, as in the embodiment of FIGS. 1 and 2, are not provided in the embodiment of FIG. 3. Instead, the counterbearings are formed by the heat exchangers on the hot side of the thermocouple elements, which are firmly connected to one another by screws 19, and assure that the assembly is solid and exceptionally stable mechanically. Spacer sleeves 20 of material that is relatively thermally nonconductive are provided between the individual heat exchangers 17.

Figure 4:
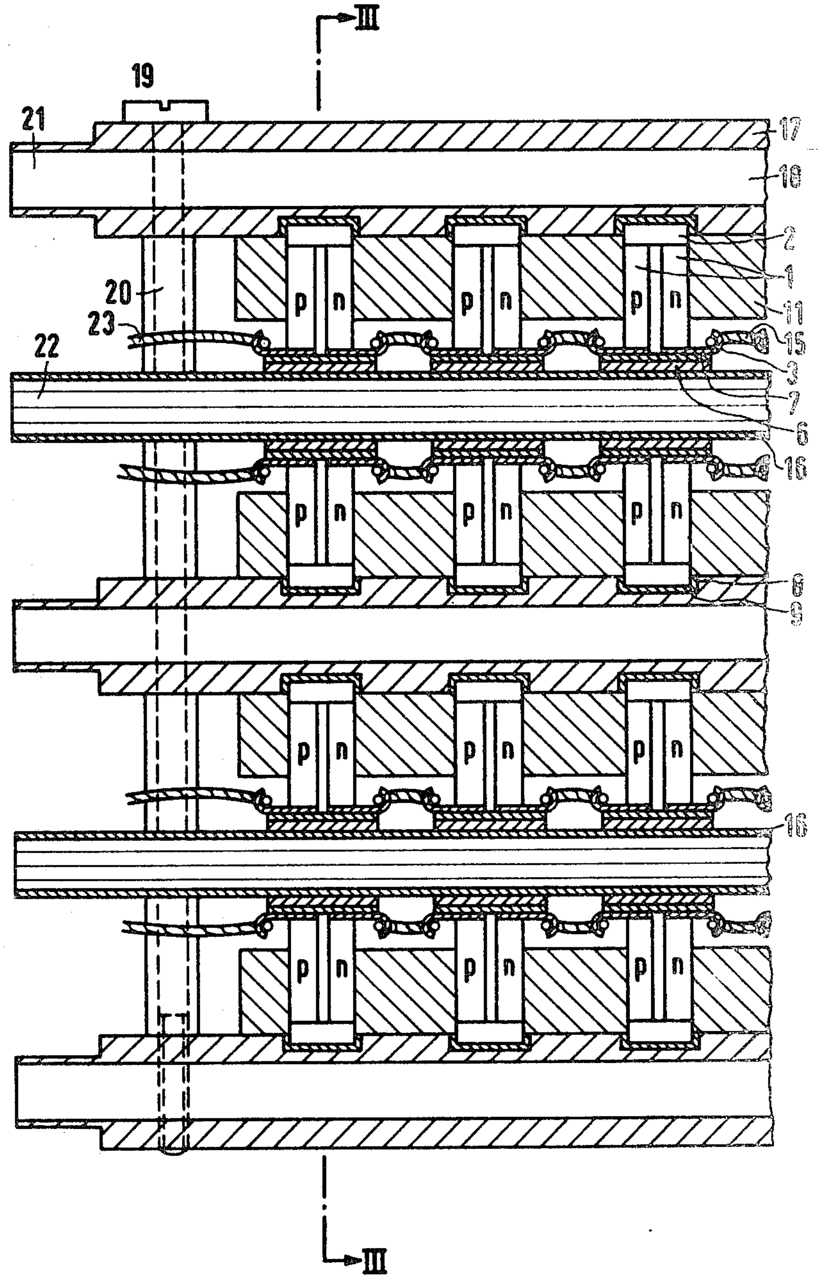
FIG. 4 is a longitudinal sectional view of FIG. 3 taken along lines IV—IV in the direction of the arrows.

In the longitudinal section of FIG. 4 there are shown silver pigtails or braided wires 15 which electrically interconnect a leg 1 of one conductivity type in each of the thermocouple elements 1, 2, 3 with a leg of opposite conductivity type in an adjacent thermocouple element. Each row of thermocouple element legs of the embodiment shown in FIG. 4 is separately connected to a current source by a lead 23 in the form of a silver pigtail, for example, so that all of the rows of thermocouple element legs are connected electrically in parallel. This is advantageous, because, in the event of the failure of one of the thermocouple elements 1, 2, 3, only one row fails therewith while all the other rows of elements continue to operate without disturbance. The terminal connection of the silver leads 23 to the current source is not shown separately. The flow channels through the "cold" and "hot" heat exchangers have connecting portions 21 and 22 which lead out of the thermoelectric generator of the invention and may be connected, respectively, into closed loops or circuits of a cold and hot heat-exchanging medium so that the flow channels of the individual rows of thermocouple elements 1, 2, 3 can be located in series or in parallel in the circuits. In conducting the heat exchanger fluid through the respective circuits, care must be taken, however, that the temperature difference between the hot and cold sides of the thermocouple element legs 1 remains the same throughout. It should also be noted that closed circuits or loops of the aforementioned type may be provided with pressure equalizing vessels.

I claim:

1. Thermoelectric assembly comprising a plurality of thermocouple element legs of opposite electrical conductivity disposed substantially parallel to one another a plurality of contact bridges electrically interconnecting said legs of opposite electrical conductivity and forming therewith a hot and cold side on opposite sides of said legs, at least two layers of said thermocouple element legs interconnected by said contact bridges being disposed one above the other, and including at least one heat exchanger located in common between the contact bridges of adjacent layers, the heat exchangers being of two types located respectively in alternating succession between adjacent layers of said thermocouple element legs, one of said types comprising a tube elastically formed of heat-conductive material deformable transversely to the axis of said tube and in the direction of the axes of said thermocouple element legs, and the other of said types comprising a solid plate of relatively good heat-conductive inelastic material formed with flow channels therein.

2. Assembly according to claim 1, wherein at least a portion of the wall of said tube has a substantially planar surface, and at least some of said contact bridges are disposed thereon.

3. Thermoelectric assembly according to claim 1, wherein said tube has a substantially rectangular cross section, two of the opposite sides thereof being planar and at least one of the other two sides being arcuate in cross section and having a line of apices extending parallel to the axis of said tube.

4. Thermoelectric assembly according to claim 1, wherein at least a portion of the wall of said tube has a substantially planar surface, and including a plurality of planar plates of inelastic material of relatively good heat conductivity being located on said planar surface, at least one of said contact bridges being superposed on each of said planar plates.

5. Thermoelectric assembly according to claim 1 wherein the flow channels of each of said types of heat exchangers are connected in at least one common circuit containing respectively a cold and a hot heat-exchanging medium.

6. Thermoelectric assembly according to claim 5 wherein the circuit containing the cold heat exchanging medium includes said elastically deformable tubes.

7. Thermoelectric assembly according to claim 1, wherein said elastically deformable tube is made of material selected from the group consisting of spring steel, tombak and spring bronze.

8. Thermoelectric assembly according to claim 4 wherein said planar plates are formed of metal selected from the group consisting of silver and copper.